No. 768,968. PATENTED AUG. 30, 1904.
D. J. SWEET.
CABINET.
APPLICATION FILED JAN. 30, 1904.
NO MODEL.

WITNESSES:

INVENTOR
Daniel J. Sweet
BY
ATTORNEYS

No. 768,968. Patented August 30, 1904.

UNITED STATES PATENT OFFICE.

DANIEL JAY SWEET, OF PITTSFIELD, MASSACHUSETTS.

CABINET.

SPECIFICATION forming part of Letters Patent No. 768,968, dated August 30, 1904.

Application filed January 30, 1904. Serial No. 191,308. (No model.)

*To all whom it may concern:*

Be it known that I, DANIEL JAY SWEET, a citizen of the United States, and a resident of Pittsfield, in the county of Berkshire and State of Massachusetts, have invented a new and Improved Cabinet, of which the following is a full, clear, and exact description.

This invention relates to improvements in cabinets particularly adapted for holding envelops containing the pay of workmen in business establishments, an object being to provide a very simple and convenient means for assembling and delivering the wages of employees.

I will describe a cabinet embodying my invention and then point out the novel features in the appended claims.

Reference is to be had to the accompanying drawings, forming a part of this specification, in which similar characters of reference indicate corresponding parts in both the figures.

Figure 1:
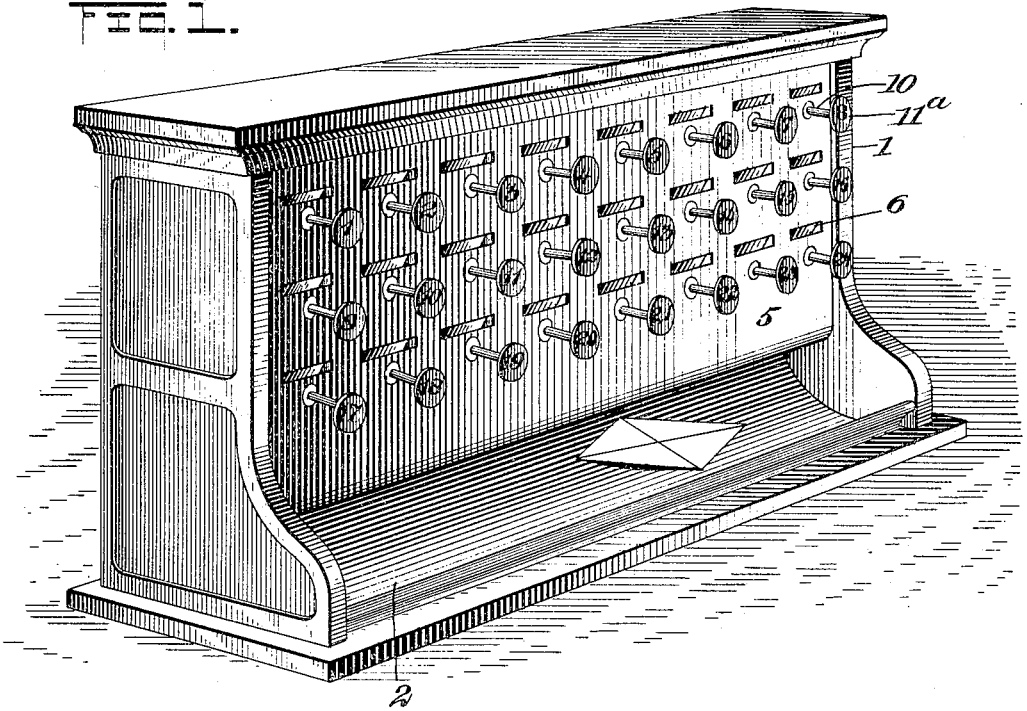
Figure 2:
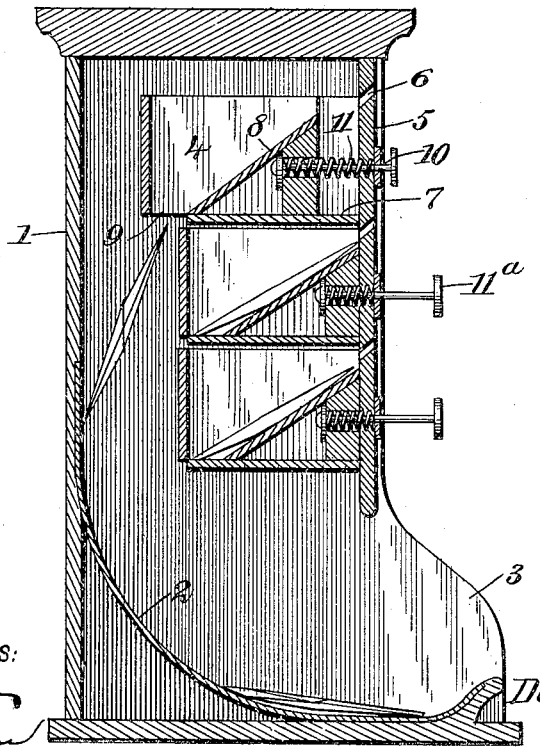

Figure 1 is a perspective view of a cabinet embodying my invention, and Fig. 2 is a sectional elevation thereof.

The cabinet comprises a casing 1, having a downwardly and outwardly curved bottom plate 2, and the lower portion of the casing at the front edge of this plate 2 is open, as indicated at 3. Arranged in the casing is a plurality of receptacles 4, which are arranged to slide inward and also to slide toward the front wall 5 of the casing. The said front wall 5 is provided with slots 6, through which envelops may be passed into the receptacles. The receptacles in a row slide on a bottom board 7, and each receptacle has a downwardly-inclined bottom wall 8, at the lower end of which is an opening 9, through which the envelops may slide to the plate 2. From each sliding receptacle a rod 10 extends outward through the front wall 5, and arranged between said front wall and the receptacle is a spring 11, said spring surrounding the rods 10 and being designed to move the receptacles to their forward positions upon releasing the outer ends of said rods 10, and on the outer ends of said rods are disks 11ª, provided with numbers.

In the operation the envelops containing the pay are to be numbered to correspond with the numbers on the pay-roll and then the envelops are to be passed into the receptacle having said numbers. In paying off it will only be necessary to force the proper receptacle inward, so that the envelop contained therein will fall out through the opening 9 onto the bottom plate 2.

This cabinet obviously may be made of any desired size and may be quite ornamental. It will take up comparatively little room on a desk or table, and by its use the paying off of a number of persons may be quickly done.

The back of the cabinet is made removable, so that repairs may be readily made when necessary.

Having thus described my invention, I claim as new and desire to secure by Letters Patent—

1. A cabinet comprising a casing and a plurality of sliding receptacles therein, each receptacle having an inclined bottom portion, and an opening for discharging into the bottom of the casing.

2. A cabinet comprising a casing having a curved bottom plate and an opening at the front, a front plate having openings, receptacles mounted to slide in the casing and adapted to receive envelops passed through said openings in the front wall, each receptacle having a downwardly and rearwardly inclined bottom portion and an opening at the lower end of said bottom portion, rods extended outward from the sliding receptacles through the front wall, and springs for moving said receptacles in one direction.

3. A cabinet comprising a casing, a plurality of receptacles mounted to slide therein, rods extended from the receptacles through the front of the casing, numbered disks on the outer ends of said rods, springs for moving the receptacles toward the front of the casing, and inclined bottom portions for the receptacles.

4. A cabinet comprising a casing, an inclined or curved bottom plate in said casing, the said casing being open at the front and at the bottom, fixed boards extended lengthwise within the casing, a plurality of receptacles mounted to slide on each board, each receptacle having an inclined bottom portion and an opening at the lower end of said bottom portion, and springs for moving the receptacles toward the front of the casing.

In testimony whereof I have signed my name to this specification in the presence of two subscribing witnesses.

DANIEL JAY SWEET.

Witnesses:
 GEORGE F. MOORE,
 EUGENE B. MITCHELL.